UNITED STATES PATENT OFFICE.

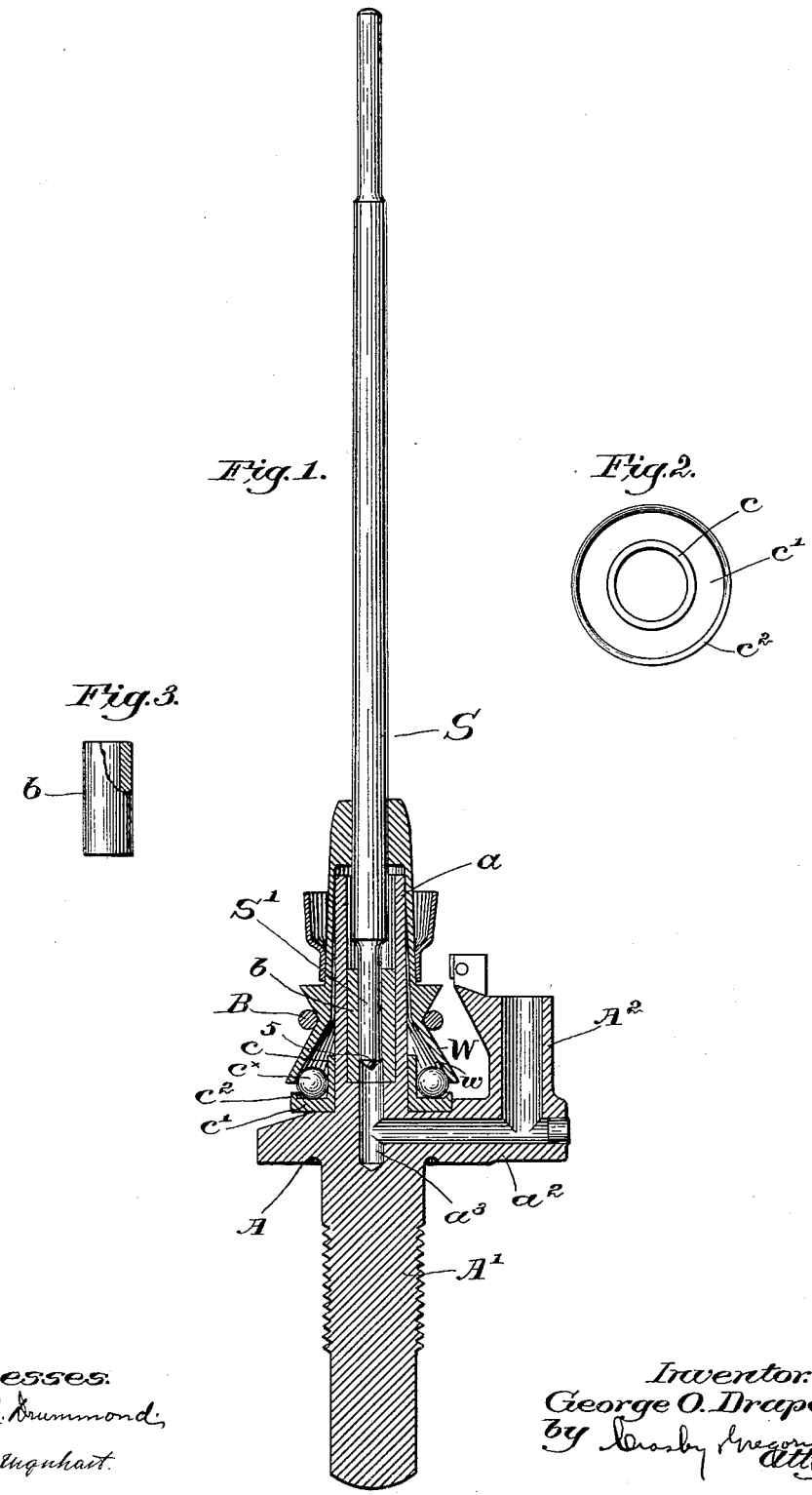

GEORGE O. DRAPER, OF HOPEDALE, MASSACHUSETTS, ASSIGNOR TO THE DRAPER COMPANY, OF SAME PLACE AND PORTLAND, MAINE.

SPINDLE AND BEARING.

SPECIFICATION forming part of Letters Patent No. 638,566, dated December 5, 1899.

Application filed January 28, 1899. Serial No. 703,667. (No model.)

*To all whom it may concern:*

Be it known that I, GEORGE O. DRAPER, of Hopedale, county of Worcester, and State of Massachusetts, have invented an Improvement in Spindles and Bearings, of which the following description, in connection with the accompanying drawings, is a specification, like letters and figures on the drawings representing like parts.

This invention relates to spindles and bearings for spinning-machines and the like; and it has for its object the production of means for reducing the friction in such devices whereby they may be run at high rates of speed with uniform vibration and with a minimum of power, the construction and arrangement being such that the spindle is vertically supported on a rolling bearing, preferably by the use of freely-rotating balls, the pull of the driving-band being resisted by a supplementary lateral bearing for the spindle.

Figure 1 is a vertical sectional view of a spindle and bearing embodying one form of my invention. Fig. 2 is a top or plan view of the raceway or seat for the antifriction members; and Fig. 3 is a side elevation, partially broken out, of the supplementary bearing for the spindle.

Referring to Fig. 1, the supporting-case A has a threaded shank A', adapted to pass through a hole in the usual spindle-rail and to receive a nut upon it (not shown) to retain the support securely on the rail, said support having an upturned hollow tubular portion $a$, forming a case for the supplementary bearing.

The supplementary or lateral bearing $b$ (shown separately in Fig. 3 and made as a sleeve or tube of hardened steel or other suitable material) is inserted with a sliding fit in the case $a$ and receives within it the reduced lower end S' of the spindle S.

A sleeve-whirl W is rigidly attached to the spindle and surrounds the case $a$, the portion of the whirl receiving the driving-band B, Fig. 1, being located substantially opposite to the supplementary or lateral bearing $b$, so that the latter takes up and resists lateral strain on the spindle due to the band pull, transmitting such strain to the case $a$.

A collar $c$ is secured to the spindle-support A at the base of the case $a$, said collar having an annular enlarged or laterally-extended base $c'$, grooved or recessed on its upper face to leave a peripheral upturned lip $c^2$ and forming a raceway or seat for the antifriction members, (shown as a series of balls $c^\times$,) said seat being closely adjacent but slightly below the bearing $b$, as herein shown. The lip $c^2$ serves to retain the balls in the raceway or seat when the spindle is withdrawn from the support A.

As herein shown, the tapering or conical inner surface $w$ of the whirl W rests upon the balls, as clearly illustrated in Fig. 1, so that the spindle is supported vertically on a series of rolling antifriction members, it being obvious from Fig. 1 that the lower end 5 of the spindle is unsupported vertically. The weight of the spindle and its attached sleeve-whirl thus rests upon the balls $c^\times$ to secure the desired contact and support, the inner bearing-surface $w$ acting to press the balls inward when the spindle is running; but the rolling bearing is relieved of lateral strain by the supplementary sleeve-like bearing $b$.

An oil-reservoir $A^2$ on the support A is connected by a duct $a^2$ with the central bore $a^3$ to conduct lubricant to the lower end S' of the spindle and to the lateral bearing $b$.

By the construction shown a very simple and light-running spindle is provided, free from improper vibration at high speeds, requiring a minimum of power, and the rolling bearing is so supported that it can be instantly exposed for examination by slightly raising the spindle to withdraw the lower end of the whirl from the said bearing. When the whirl is so withdrawn or the spindle wholly removed from its support, the lip $c^2$ retains the antifriction members of the rolling bearing in place.

Having herein described the nature of my invention in one practical embodiment thereof, without attempting to set forth all of the forms in which it may be made or the various modes of its use, what I claim, and desire to secure by Letters Patent, is—

1. A spindle, a short and loose cylindrical lateral bearing in which it rotates, and a rolling bearing to sustain the spindle vertically, located wholly below and exterior to the said cylindrical bearing.

2. A rotatable spindle having an attached sleeve-whirl, a rolling bearing on which the under face of the whirl travels, to support the spindle vertically, and a loose, short sleeve-like lateral bearing for the spindle, located wholly above the rolling bearing and in the line of the band pull.

3. A rotatable spindle having an attached sleeve-whirl provided at its lower portion with an internally-conical bearing-surface, a rolling bearing for said surface, to support the spindle vertically, and an independent loose and cylindrical lateral bearing for the spindle, wholly above the rolling bearing.

4. A rotating spindle having an attached outwardly and downwardly tapering internal bearing portion, a series of rotating antifriction members on which said bearing portion rests and is supported vertically, and a loose, short sleeve-bearing for the spindle, located wholly above the rolling bearing.

5. A spindle-support having a short, loose internal cylindrical bearing, an external annular raceway exterior and wholly below the lower end of the cylindrical bearing and having an upturned retaining-lip, a series of antifriction-balls in said raceway projecting above the lip, a removable spindle adapted to enter the loose cylindrical bearing, and an internally-conical bearing member attached to the spindle, to rest upon and travel on the balls and to support the spindle vertically.

In testimony whereof I have signed my name to this specification in the presence of two subscribing witnesses.

GEORGE O. DRAPER.

Witnesses:
E. D. BANCROFT,
A. H. COUSINS.